Aug. 2, 1927.

H. G. OTT 1,637,348

VERTICAL ILLUMINATOR FOR MICROSCOPES

Filed Oct. 13, 1924

INVENTOR.
Harry G. Ott
by Parker, Mochwo & Bean
ATTORNEYS.

UNITED STATES PATENT OFFICE.

HARRY G. OTT, OF BUFFALO, NEW YORK, ASSIGNOR TO SPENCER LENS COMPANY, OF BUFFALO, NEW YORK.

VERTICAL ILLUMINATOR FOR MICROSCOPES.

Application filed October 13, 1924. Serial No. 743,308.

This invention relates to vertical illuminators for microscopes, by means of which light is passed downwardly through the microscope itself to illuminate the object which is to be examined.

In examining opaque objects by means of a microscope, difficulty has been experienced in properly illuminating the object since the objective of the microscope is generally placed so close to the object as to exclude light from outside of the microscope itself, from the object, and the means heretofore used for illuminating the object by means of light passing downwardly through the microscope itself have either interfered with the resolving power of the instrument or have introduced reflections of the light which would pass through the eye piece and cause the objects to appear hazy.

The objects of this invention are to provide a vertical illuminator for microscopes which is designed to overcome these objections; also to improve vertical illuminating means for microscope in other respects hereinafter specified.

Figure 1:
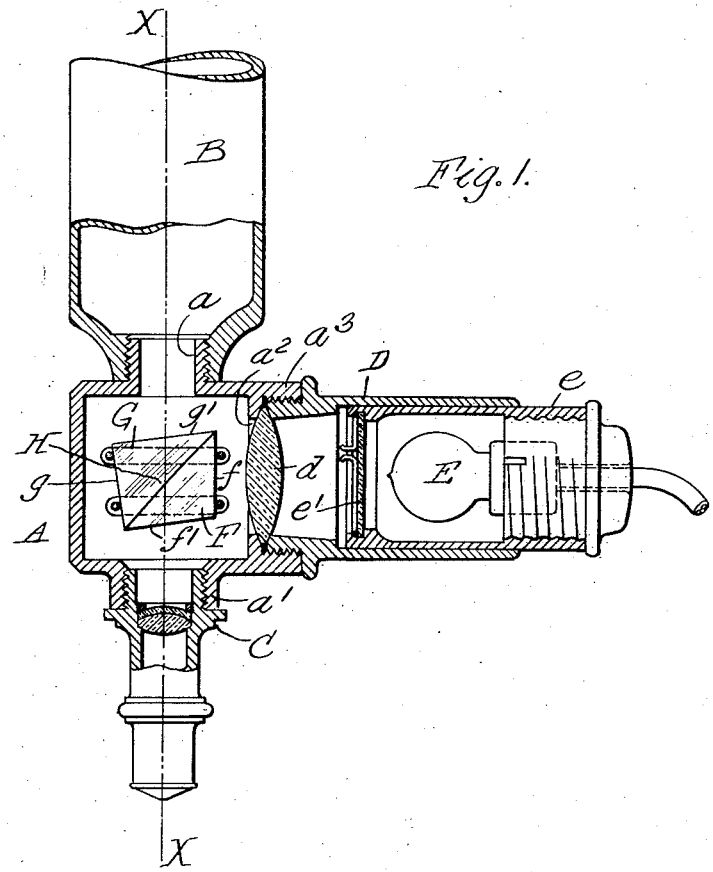
Fig. 1 is a fragmentary central sectional elevation of a microscope provided with a vertical illuminator embodying this invention.

A represents a reflector housing of the vertical illuminator which may be attached to a microscope and adapted to contain means for reflecting light to the object. This housing is provided at its upper end with a threaded tubular projection $a$ to which the usual body tube B of a microscope is secured, and the lower part of the housing A has a threaded tubular projection or part $a'$ to which the usual objective C of the microscope may be secured. The housing A is also provided at one side with a light opening $a^2$ and with a tubular extension $a^3$ adjacent to the light opening to which a housing D, containing any suitable source of light E, may be secured. A condenser lens $d$ is arranged, in the construction shown, at the light opening $a^2$ of the housing A. The source of light E, in the construction shown, is mounted in a tube $e$ telescopically arranged with reference to the outer end of the light housing D, and the usual ground glass screen $e'$ is preferably also mounted in the tube $e$, so that by adjusting the tube $e$ relatively to the condenser lens $d$, the proper focus of the light on the object may be obtained. The light housing in the particular construction shown, is arranged with its axis substantially at right angles to the optical axis of the microscope, indicated by the line X—X. The light housing and source of light may be omitted, if it is desired to utilize a source of light detached from the apparatus. All of the parts described, or their equivalents, have been heretofore used in connection with vertical illuminators and of themselves do not form a part of my invention.

In order to obtain a satisfactory illumination of the object, it is necessary to pass rays of light from the source of light E downwardly through the objective lenses to the object without permitting rays from the source of light to be deflected into the body tube, and thence into the eyes of the observer, and at the same time it is desirable, in order to avoid interfering with the resolving power of the instrument that the rays of light passing upwardly through the microscope from any part of the object be not intercepted, as was heretofore done by means of prism reflectors which were placed approximately half way across the path of light from the object to the eye of the observer, and, therefore, covered half of the aperture of the objective. In order to provide a vertical illuminator overcoming these difficulties, the construction shown in the drawings, which illustrate one embodiment of my invention, may be employed.

The housing A has secured therein a pair of prisms F and G, the prisms being secured together so that the oblique surfaces are in contact and either one or both of the contacting faces thereof have deposited thereon reflecting material adapted to reflect a certain percentage of the light striking these surfaces. This may be done by any well known method of depositing a very thin film of metal or other material having light reflecting properties upon the surface of glass so as to cause the reflection of a part of the light rays and thus permitting other rays of light to pass through this partially reflecting surface. The prisms are so positioned in the housing A that the partly reflecting contacting surfaces H of the two prisms is arranged at such an angle to the axis of the microscope and to the source of light as to cause a part of the light striking the surface H from the source of illumination to be reflected downwardly through the objective lenses to the object, the remainder of the light passing through the reflecting surface H and being absorbed by the walls of the housing A. In the particular construction shown, the partially reflecting surface has been found to produce the most satisfactory results if the film on the surface H is such as to reflect about half of the rays striking this surface. Only a part of the rays of light passing in the general direction of the optical axis X of the microscope will be intercepted by the reflecting surface H so that some rays of light from all parts of the microscope objective will pass to the eye of the observer. Consequently, the partially reflecting surface H will not interfere in any way with the resolving power of the microscope.

Another source of trouble in connection with vertical illuminators heretofore used is due to the reflection of certain rays from the source of light upwardly through the body tube B. Such rays may be reflected by the various surfaces of prisms, plates or other reflecting means used in connection with the production of the vertical illumination.

In accordance with my invention, these objectionable reflections are overcome by forming the prisms so that those sides or faces thereof which may reflect light rays emanating from the source of light are so arranged or formed that these objectionable reflections are not passed into the eyes of observers. Referring to the construction shown in the drawings, the side $f$ of the prism F which is nearest to the source of light is arranged substantially perpendicular to the axis of the light housing D and of the condenser lens $d$, so that if any rays are reflected from the surface, they will be passed back to the condenser lens $d$. The side $g$ of the other prism G, which is arranged directly opposite to the side $f$, should not, however, be arranged parallel to the face $f$, since otherwise some rays of light passing through the reflecting surface H and striking the surface $g$ would be reflected back to the surface H and thence upwardly through the body tube. In order to avoid a reflection of this kind, this surface $g$ extends at an angle other than half a right angle from the reflecting surface H, and consequently any rays reflected from the surface $g$ will strike the partially reflecting surface H at an angle such that these reflected rays will not pass through the body tube B to the field lens of the eye piece, but will strike and be absorbed by the inner wall of the housing A or of the tube B. In the construction shown, the side or face $g$ is arranged at an angle greater than half a right angle to the reflecting surface H. It must be borne in mind that the prisms are shown in Fig. 2 as shifted slightly out of their correct positions shown in Fig. 1.

Figure 2:
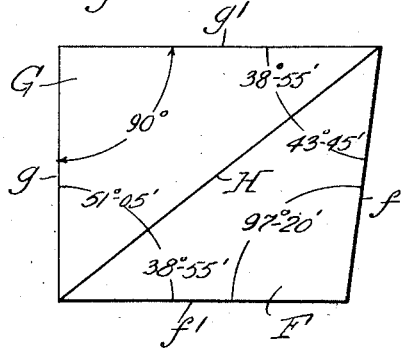
Fig. 2 is a face view of the partially reflecting prisms used in connection with the vertical illuminator embodying the invention, the prisms in this figure being shown in different angular positions than in Fig. 1.
Figure 3:
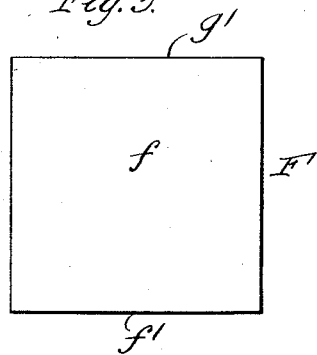
Fig. 3 is an end view thereof.

The surface $f'$ of the prism F and the surface $g'$ of the prism G are arranged parallel to each other so as to avoid angular dispersion of rays passing from the object to the eye of the observer and these surfaces must also be arranged at an angle other than a right angle to the optical axis, as is clearly shown in Fig. 1. The reason for arranging the surfaces $f'$ and $g'$ at an angle other than a right angle to the optical axis is that some rays of light passing from the partially reflecting surfaces H downwardly through the surface $f'$ may be reflected by this surface, and if this surface were perpendicular to the optical axis, some of these reflected rays would pass through the partial reflecting surface H and into the body tube and become decidedly objectionable. By arranging this surface at an angle, as indicated in Fig. 1, any rays thus reflected in passing through the surface $f'$ will be reflected at an angle to the optical axis, and thus pass to the sides of the housing A or to the sides of the body tube B, and will therefore, not be seen by a person looking through the microscope. I have indicated in Fig. 2 the angles of the prisms F and G which I have found to be satisfactory in a microscope in which the light ray housing D is arranged at right angles to the optical axis of the microscope. It is not, of course, intended to limit the invention to the angles indicated, since it will be obvious that these angles must be changed under certain conditions, and even under the same conditions as shown in Fig. 1, these angles may be changed without departing from my invention, so long as the angles of the sides serve the purpose of preventing undesirable light rays from passing to the eyes of an observer. It will be noted that these angles are such that the partially reflecting surface is not arranged exactly at an angle of 45° from the optical axis, this being for the purpose of compensating for the refraction of the rays in passing out of the face $f'$ of the prism F, the reflected light rays after leaving the prism being substantially parallel to the optical axis.

The construction described results in a vertical illuminator which affords a clear, unblurred view of the object and which does not interfere with the resolving power of the microscope, and consequently makes possible the better examination of opaque objects than could heretofore be obtained. The vertical illuminator, further, is of rugged and strong construction and the reflecting surface H, being arranged between the two prisms, is not exposed to injury.

I claim as my invention:

1. A vertical illuminator for microscopes, including means for admitting light at one side of the illuminator at an angle to the optical axis of the microscope, a pair of prisms arranged in said optical axis and having two faces arranged in contact, a partially reflecting continuous, microscopically thin film of material between said contacting faces and arranged at an angle to the optical axis to reflect light admitted at one side of the illuminator to the object, and through which light rays from the object may pass to the eye of the observer, the outer faces of the prisms being formed to cause light passing through said prisms and reflected from outer faces of said prisms to pass in directions other than perpendicular to said outer faces.

2. A vertical illuminator for microscopes, including means for admitting light at one side of the illuminator at an angle to the optical axis of the microscope, a pair of prisms arranged in said optical axis and having two faces arranged in contact, and a partially reflecting continuous, microscopically thin film of material between said contacting faces and arranged at an angle to the optical axis to reflect light admitted at one side of the illuminator to the object, and through which light rays from the object may pass to the eye of the observer the outer sides of said prisms being formed so that light reflected thereby will pass in directions other than that of the optical axis of the microscope.

3. A vertical illuminator for microscopes, including means for admitting light at one side of the illuminator at an angle to the optical axis of the microscope, a pair of prisms arranged in said optical axis and having two faces arranged in contact, and a partially reflecting uniform film of material between said contacting faces and arranged at an angle to the optical axis to reflect light admitted at one side of the illuminator to the object, the upper and lower faces of said prisms being parallel to each other and arranged at a slight angle to planes extending at right angles to said optical axis, whereby light rays from the object may pass through said prisms and said partially reflecting surface to the eye of the observer without dispersion and whereby light reflected by said faces is diverted away from said optical axis.

4. A vertical illuminator for microscopes, including means for admitting light at one side of the illuminator at an angle to the optical axis of the microscope, a pair of prisms arranged in said optical axis and having two faces arranged in contact and treated to form a uniform surface having the property of partially reflecting light rays, said surface being positioned to reflect light rays admitted at one side of the illuminator to the object, the sides of the prisms through which light passes from said side of the illuminator being arranged at such angles that light reflected from said sides will pass at such angles to the axis of the microscope as to be unobserved by a person using the microscope.

5. A vertical illuminator for microscopes, including means for admitting light at one side of the illuminator at an angle to the optical axis of the microscope, a pair of prisms arranged in said optical axis and having two faces arranged in contact and treated to form a surface having a property of partially reflecting light rays, said surface being positioned to reflect light rays admitted at one side of said illuminator to the object, the side of one of the prisms through which light passes out of the prism to the object being arranged at an angle to the optical axis other than a right angle so that rays of light reflected from said surface will be invisible to an observer.

6. A vertical illuminator for microscopes, including means for admitting light at one side of the illuminator at an angle to the optical axis of the microscope, a pair of prisms arranged in said optical axis and having two faces arranged in contact and treated to form a surface having the property of partially reflecting light rays, said surface being so positioned to reflect light rays from said side of said illuminator to the object, the side of one of the prisms through which light passing through said partially reflecting surface passes being arranged at a small angle to the axis of the microscope so that rays of light reflected by said side and again reflected by said partially reflecting surface will be invisible to an observer.

7. A vertical illuminator for microscopes, including means for admitting light at one side of the illuminator at an angle to the optical axis of the microscope, a pair of prisms arranged in said optical axis and having two faces arranged in contact and treated to form a surface having the property of partially reflecting light rays, said surface being positioned to reflect light rays from said side of said illuminator to the object, the side of one of the prisms through which light passes out of the prism to the object being arranged at an angle to the optical axis other than a right angle so that rays of light reflected from said surface will be invisible to an observer, and the side of said other prism opposite to said first-mentioned side being parallel to said first-mentioned side.

8. A vertical illuminator for microscopes, including means for admitting light at one side of the illuminator at an angle to the optical axis of the microscope, a pair of prisms arranged in said optical axis and having two faces arranged in contact and treated to form a surface having the property of partially reflecting light rays, said surface being positioned to reflect light rays from said side of said illuminator to the object, the side of one of said prisms through which light enters said prism being perpendicular to the rays of light entering from said side of said illuminator and the side of said prism through which the reflected rays pass out of said prism being arranged at a slight angle to the perpendicular to said reflected rays.

9. A vertical illuminator for microscopes, including means for admitting light at one side of the illuminator at an angle to the optical axis of the microscope, a pair of prisms arranged in said optical axis and having two faces arranged in contact and treated to form a surface having the property of partially reflecting light rays, said surface being positioned to reflect light rays entering from said side of said illuminator to the object, the side of one of said prisms through which light enters said prism being perpendicular to the rays of light entering from said side of said illuminator and the side of said prism through which the reflected rays pass out of said prism being arranged at a slight angle to the perpendicular to said reflected rays, the side of the other prism to which rays passing through said partially reflecting surface pass being arranged at a slight angle to the axis of the microscope.

HARRY G. OTT.